US011528364B2

(12) United States Patent
Lundsgaard et al.

(10) Patent No.: US 11,528,364 B2
(45) Date of Patent: *Dec. 13, 2022

(54) MACHINE LEARNING SYSTEM FOR ROUTING OPTIMIZATION BASED ON HISTORICAL PERFORMANCE DATA

(71) Applicant: Allstate Insurance Company, Northbrook, IL (US)

(72) Inventors: Soren K. Lundsgaard, Inverness, IL (US); Anthony Pham, Northbrook, IL (US); Ryan Dunn, Grayslake, IL (US)

(73) Assignee: ALLSTATE INSURANCE COMPANY, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/408,993

(22) Filed: Aug. 23, 2021

(65) Prior Publication Data

US 2022/0159123 A1 May 19, 2022

Related U.S. Application Data

(63) Continuation of application No. 17/098,761, filed on Nov. 16, 2020, now Pat. No. 11,128,754.

(51) Int. Cl.
*H04M 3/523* (2006.01)
*H04M 3/51* (2006.01)

(52) U.S. Cl.
CPC ................. *H04M 3/5232* (2013.01)

(58) Field of Classification Search
CPC ...... H04M 3/51; H04M 3/523; H04M 3/5232; H04M 2203/551

(Continued)

(56) References Cited

U.S. PATENT DOCUMENTS 6,173,053 B1 1/2001 Bogart et al.
7,023,979 B1 4/2006 Wu et al.
(Continued)

OTHER PUBLICATIONS

Rana Gujral, "How AI is Transforming Call Centers with Actionable Insights" Upside https://tdwi.org/articles/2020/06/30/adv-all-how-ai-is-transforming-call-centers-with-actionable-insights.aspx Jun. 30, 2020, pp. 1-8.

(Continued)

*Primary Examiner* — Harry S Hong
(74) *Attorney, Agent, or Firm* — Dinsmore & Shohl, LLP (57) ABSTRACT

Aspects of the disclosure relate to using machine learning for optimized call routing. A computing platform may receive requests to establish a voice call session. Based on corresponding phone numbers, the computing platform may identify demographic information for corresponding clients. Using a machine learning model and based on the demographic information and representative performance data, the computing platform may score potential client-representative combinations to indicate likelihoods of a successful outcome resulting from establishing a voice call session between the respective client and representative. Scoring the potential client-representative combinations may be based on fall off rates, indicating changes in representative effectiveness as hold time increases. The computing platform may adjust the scores based on a historical frequency of interaction between each representative and clients corresponding to the identified demographic information. Based on the adjusted scores, the computing platform may select at least one of the potential client-representative combinations.

20 Claims, 8 Drawing Sheets

(58) Field of Classification Search
USPC .................. 379/265.01–265.14, 266.07
See application file for complete search history.

(56) References Cited

U.S. PATENT DOCUMENTS

| | | |
|---|---|---|
| 8,295,471 B2 | 10/2012 | Spottiswoode et al. |
| 8,699,694 B2 | 4/2014 | Chishti et al. |
| 8,724,797 B2 | 5/2014 | Chishti et al. |
| 8,948,369 B2 | 2/2015 | Shaffer et al. |
| 9,020,137 B2 | 4/2015 | Chishti et al. |
| 9,208,465 B2 | 12/2015 | Grasso et al. |
| 9,313,332 B1 | 4/2016 | Kumar et al. |
| 9,491,295 B2 | 11/2016 | Shaffer et al. |
| 9,723,151 B2 | 8/2017 | McGann et al. |
| 9,894,205 B1 | 2/2018 | Miller et al. |
| 9,967,400 B2 | 5/2018 | Eftekhari et al. |
| 10,044,867 B2 | 8/2018 | Spottiswoode et al. |
| 10,091,357 B1 | 10/2018 | Stern et al. |
| 10,547,748 B1 | 1/2020 | Merritt |
| 11,128,754 B1* | 9/2021 | Lundsgaard ........ H04M 3/5232 |
| 2005/0043986 A1* | 2/2005 | McConnell ......... H04M 3/5232 |
| | | 379/265.02 |
| 2008/0152122 A1* | 6/2008 | Idan .................... H04M 3/5175 |
| | | 379/265.07 |
| 2009/0041226 A1* | 2/2009 | Jabbour .............. H04M 3/5232 |
| | | 379/265.14 |
| 2009/0103709 A1* | 4/2009 | Conway ............. H04M 3/5175 |
| | | 379/265.09 |
| 2009/0190744 A1* | 7/2009 | Xie .................... H04M 3/5232 |
| | | 379/265.11 |
| 2013/0216036 A1* | 8/2013 | Chishti ............... H04M 3/5175 |
| | | 379/265.11 |
| 2013/0251137 A1* | 9/2013 | Chishti ............... H04M 3/5238 |
| | | 379/265.11 |
| 2014/0362984 A1* | 12/2014 | Danson ............... H04M 3/5175 |
| | | 379/265.06 |
| 2015/0100528 A1* | 4/2015 | Danson .................... G06N 5/04 |
| | | 706/21 |
| 2016/0071134 A1* | 3/2016 | Duncan ............. G06Q 30/0204 |
| | | 705/7.33 |
| 2017/0013131 A1 | 1/2017 | Craib |
| 2017/0111503 A1* | 4/2017 | McGann ............. H04M 3/5235 |
| 2018/0159977 A1* | 6/2018 | Danson ............... H04M 3/5232 |
| 2019/0253558 A1 | 8/2019 | Haukioja et al. |
| 2020/0099790 A1 | 3/2020 | Ma et al. |

OTHER PUBLICATIONS

"Machine learning implementation strategy for a customer service center" Microsoft Dynamics 365 Blog https://cloudblogs.microsoft.com/dynamics365/bdm/2018/02/07/machine-learning-implementation-strategy-for-a-customer-service-center/ Feb. 7, 2018, pp. 1-14.

Abbas Raza Ali "Intelligent call routing: Optimizing contact center throughput" ResearchGate/IBM United Kingdom Aug. 2011, pp. 1-10.

"A Method and System for Intelligently Routing Callers to One or More Agents in a Call Center Environment" iYogi Limited, Sep. 9, 2014, pp. 1-34.

International Search Report and Written Opinion for Appln. No. PCT/US21/59527, dated Feb. 3, 2022, 15 pages.

* cited by examiner

| Representative | Answered now | | Answered in 1 minute | |
|---|---|---|---|---|
| Caller | R1 | R2 | R1 | R2 |
| C1 (1 minute wait) | 50 | 60 | 20 | 50 |
| C2 (2 minute wait) | 40 | 70 | 30 | 30 |

FIG. 4

MACHINE LEARNING SYSTEM FOR ROUTING OPTIMIZATION BASED ON HISTORICAL PERFORMANCE DATA

CROSS-REFERENCE TO RELATED APPLICATIONS

The present disclosure is a continuation of U.S. application Ser. No. 17/098,761, filed Nov. 16, 2020, the entirety of which is incorporated by reference herein.

BACKGROUND

Aspects of the disclosure relate to processing systems. In particular, aspects of the disclosure relate to processing systems having a machine learning engine and machine learning datasets.

In some instances, individuals may request to establish voice call sessions with employees of an enterprise organization (e.g., customer service representative, agents, and/or other employees). The enterprise organizations may route these requests to available representatives in a generic manner based on representative availability. In many instances, however, this may result in sub-optimal call routing and thus may result in sub-optimal communication between employees and clients.

SUMMARY

Aspects of the disclosure provide effective, efficient, scalable, and convenient technical solutions that address and overcome the technical problems associated with call routing.

In accordance with one or more embodiments, a computing platform comprising at least one processor, a communication interface communicatively coupled to the at least one processor, and memory may receive, from one or more client devices, a number of requests to establish a voice call session. The computing platform may identify, based on phone numbers corresponding to the one or more client devices, demographic information corresponding to users of the one or more client devices. The computing platform may score, using a machine learning model and based on the demographic information and performance data for each of a plurality of representatives, potential client-representative combinations, where: 1) the score for each potential client-representative combination indicates a likelihood of a successful outcome resulting from establishing a voice call session between the respective client and representative, and 2) scoring the potential client-representative combinations is based on fall off rates for each of the users of the one or more client devices, where the fall off rates indicate changes in representative effectiveness with each of the users of the one or more client devices as a hold time increases. The computing platform may adjust the scores based on a historical frequency of interaction between each representative and clients corresponding to the identified demographic information. The computing platform may select, based on the adjusted scores, at least one of the potential client-representative combinations. The computing platform may establish a voice call session for the at least one of the potential client-representative combinations.

In one or more instances, the computing platform may collect representative performance data indicating sales performance of each of the plurality of representatives during their communication with clients corresponding to different demographics data. The computing platform may train, using the representative performance data, the machine learning model, which may configure the machine learning model to output the scores.

In one or more instances, the adjusted scores may indicate how likely a representative of a particular potential client-representative pair is to make a sale to the corresponding client of the particular potential client-representative pair. In one or more instances, the demographics information may indicate one or more of: gender, previous accidents, previous contact with the enterprise organization, age, family composition, marital status, education information, income information, or geographic information corresponding to the users of the one or more client devices.

In one or more instances, scoring the potential client-representative combinations may further include: 1) comparing the number of requests to establish a voice call session to a number of available representatives; 2) based on identifying that the number of requests to establish a voice call session exceeds the number of available representatives, scoring, using the machine learning model, combinations of each available representative with each user corresponding to the requests to establish a voice call session to identify an optimal user for each representative to serve; and 3) based on identifying that the number of available representatives exceeds the number of requests to establish the voice call session, scoring, using the machine learning model, combinations of each available representative with each user corresponding to the requests to establish a voice call session to identify an optimal representative to serve each user.

In one or more instances, the fall off rates may indicate a tolerance for being on hold for the users of the one or more client devices. In one or more instances, the computing platform may identify the plurality of representatives by: 1) identifying representatives that are currently available to engage in a voice call session, and 2) identifying representatives that are not currently available, but that will likely be available within a predetermined amount of time.

In one or more instances, the computing platform may adjust the scores based on time information corresponding to the performance data. In one or more instances, the computing platform may score the potential client-representative combinations by: 1) scoring the potential client-representative combinations at a current time and one or more future times, and 2) computing an overall score for each client-representative combination by adding the scores for the current time and the one or more future times.

In one or more instances, the computing platform may select the at least one of the potential client-representative combinations based on the overall scores. In one or more instances, the computing platform may receive additional performance data from the selected at least one of the potential client-representative combinations. The computing platform may update, based on the additional performance data, the machine learning model.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further below, systems and methods for optimal routing of client calls to customer service representatives are described. For example, when clients call into a call center, it may be important to provide the best possible service to each customer. Accordingly, a machine learning model is described that identifies characteristics and/or features of inbound callers, and connects those callers with customer service representatives who may provide the best service to the customer.

In some instances, when there are many callers waiting to speak to a customer service representative and one customer service representative becomes available, each waiting caller may be scored with the customer representative. Accordingly, a score may be computed representing how well that customer service representative may perform with each waiting caller, and the best scoring representative may be assigned to each waiting caller.

In some instances, there may be fewer callers than available customer service representatives. In these instances, based on a phone number of an incoming caller to a call center, systems may look up internal and/or external data based on the phone number (e.g., from an internal or external database). Accordingly, a score may be computed representing how well each customer service representative may perform with the caller, and the caller may be assigned to the representative who may best serve the customer.

In doing so, technical solutions to technical problems may be provided. For example, machine learning and analytics may be leveraged in enhanced ways to improve client service communications and to increase sales, items sold, items to call, policy conversions, rate bundles, and/or provide other advantages by automatically routing clients to one or more representatives who have been predetermined to have the best chance at producing a positive outcome for an inbound sales call based on a specific set of known attributes.

Figure 1A:
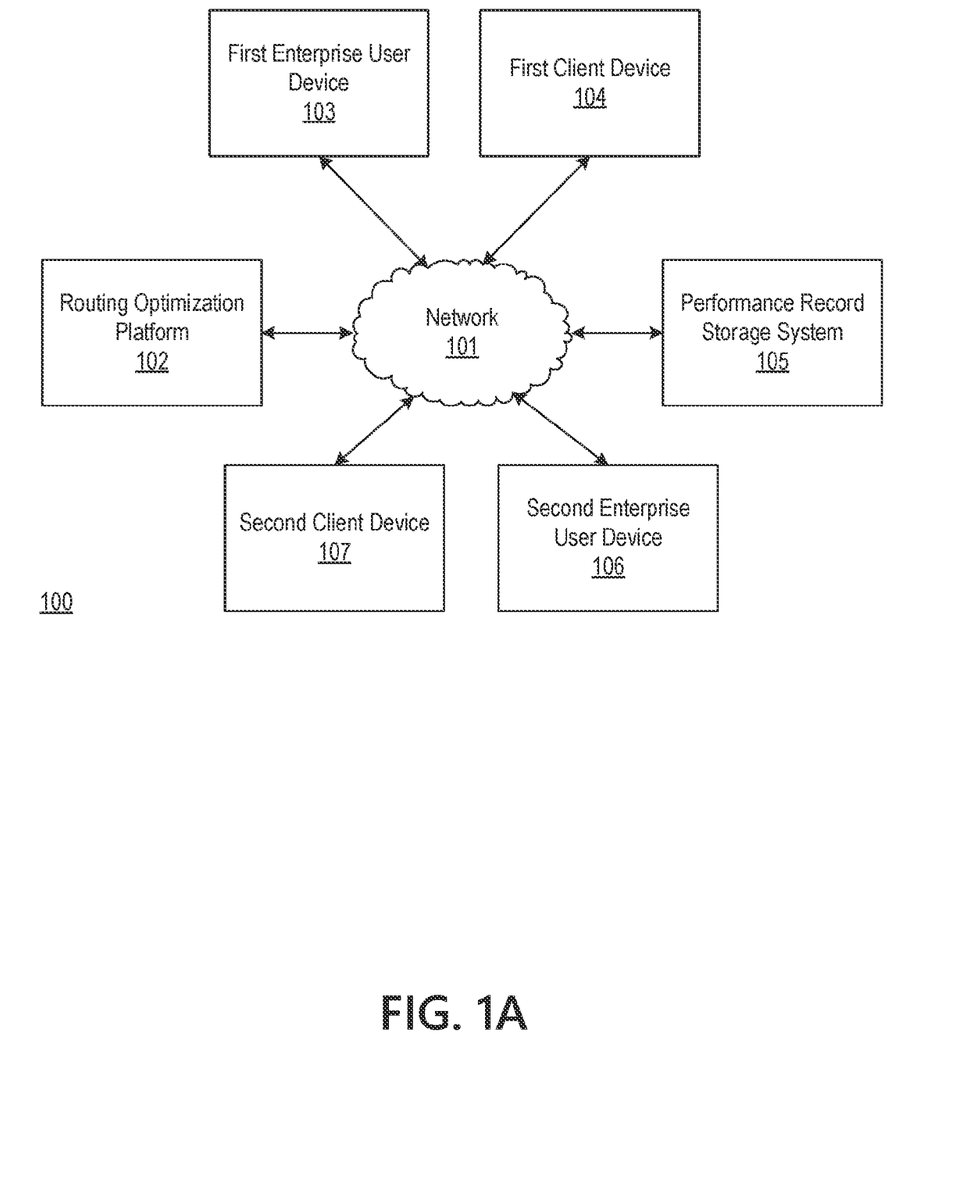
FIGS. 1A and 1B depict an illustrative computing environment for applying machine learning for optimized communication routing in accordance with one or more example embodiments.
Figure 1B:
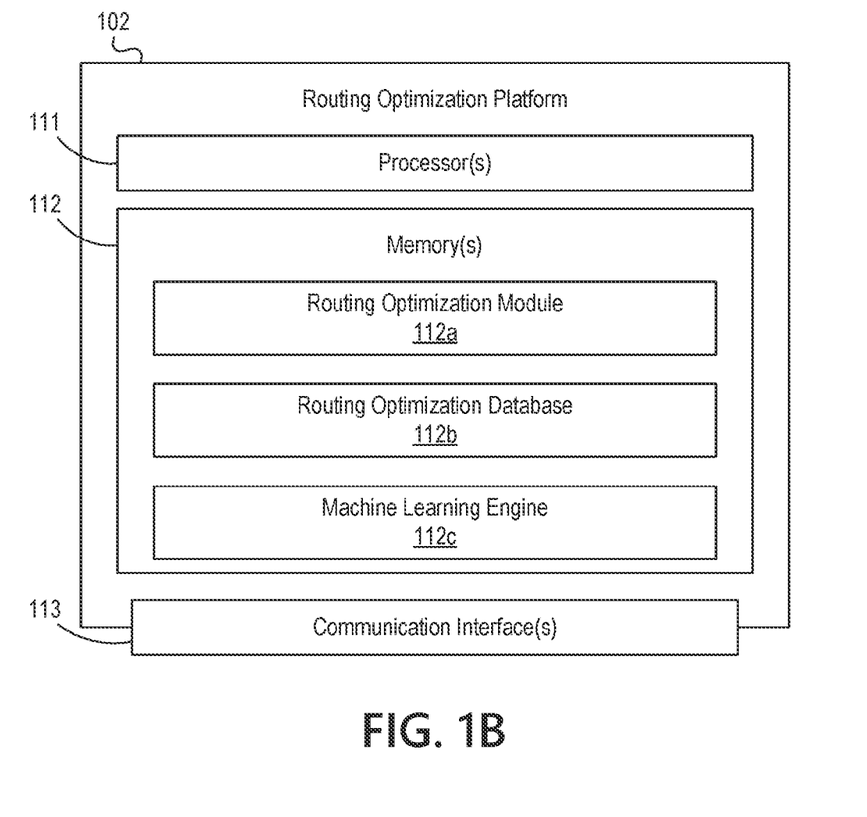

FIGS. 1A and 1B depict an illustrative computing environment for applying machine learning for optimized communication routing in accordance with one or more example embodiments. Referring to FIG. 1A, computing environment 100 may include one or more computer systems. For example, computing environment 100 may include a routing optimization platform 102, first enterprise user device 103, first client device 104, performance record storage system 105, second enterprise user device 106, and second client device 107.

As illustrated in greater detail below, routing optimization platform 102 may include one or more computing devices configured to perform one or more of the functions described herein. For example, routing optimization platform 102 may include one or more computers (e.g., laptop computers, desktop computers, servers, server blades, or the like) and/or other computer components (e.g., processors, memories, communication interfaces). In addition, and as illustrated in greater detail below, routing optimization platform 102 may be configured to apply one or more machine learning techniques to route voice call session requests from client devices (e.g., first client device 104, second client device 107, or the like) to enterprise user devices (e.g., first enterprise user device 103, second enterprise user device 106, or the like) in an optimal manner (e.g., maximize odds of a sale).

First enterprise user device 103 may be a computing device (e.g., smartphone, landline telephone, tablet, desktop computer, laptop computer, or other personal computing device) that may be used by an enterprise user (e.g., a representative or other employee at an enterprise organization, such as an insurance provider). In some instances, the first enterprise user device 103 may be configured to establish a voice call session with another computing device (e.g., first client device 104, second enterprise user device 106, second client device 107, and/or other communication devices).

First client device 104 may be a computing device (e.g., smartphone, landline telephone, tablet, desktop computer, laptop computer, or other personal computing device) that may be used by a client (e.g., a current or prospective client of an enterprise organization such as an insurance institution). In some instances, the first client device 104 may be configured to establish a voice call session with another computing device (e.g., first enterprise user device 103, second enterprise user device 106, second client device 107, and/or other communication devices).

Performance record storage system 105 may include one or more computers (e.g., laptop computers, desktop computers, servers, server blades, or the like) and/or other computer components (e.g., processors, memories, communication interfaces). In some instances, performance record storage system 105 may be configured to store and provide performance data for employees of an enterprise organization corresponding to the routing optimization platform 102 (e.g., an insurance institution). For example, the performance record storage system 105 may store information indicating particular representatives success in sales, policy conversions, rate bundles, and/or other tasks related to the enterprise organization for various existing and/or potential clients. In this example, the performance record storage system 105 may additionally store demographics information corresponding to the potential clients. Accordingly, the performance record storage system 105 may be configured to provide information that may be used to identify a client base with which each representative is most successful (e.g., has a highest rate of sale, highest rate of completion, or the like).

Second enterprise user device 106 may be a computing device (e.g., smartphone, landline telephone, tablet, desktop computer, laptop computer, or other personal computing device) that may be used by an enterprise user (e.g., a representative or other employee at an enterprise organization, such as an insurance institution). In some instances, the second enterprise user device 106 may be configured to establish a voice call session with another computing device (e.g., first client device 104, first client device 104, second client device 107, and/or other communication devices).

Second client device 107 may be a computing device (e.g., smartphone, landline telephone, tablet, desktop computer, laptop computer, or other personal computing device) that may be used by a client (e.g., a current or prospective client of an enterprise organization such as an insurance institution). In some instances, the second client device 107 may be configured to establish a voice call session with another computing device (e.g., first enterprise user device 103, first client device 104, second enterprise user device 106, and/or other communication devices).

Computing environment 100 also may include one or more networks, which may interconnect one or more of routing optimization platform 102, first enterprise user device 103, first client device 104, performance record storage system 105, second enterprise user device 106, second client device 107, and/or one or more other systems, public networks, sub-networks, and/or the like. For example, computing environment 100 may include a network 101.

In one or more arrangements, routing optimization platform 102, first enterprise user device 103, first client device 104, performance record storage system 105, second enterprise user device 106, and/or second client device 107, and/or the other systems included in computing environment 100 may be any type of computing device capable of receiving a user interface, receiving input via the user interface, and/or communicating the received input to one or more other computing devices. For example, the systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of routing optimization platform 102, first enterprise user device 103, first client device 104, performance record storage system 105, second enterprise user device 106, and/or second client device 107 may, in some instances, be special-purpose computing devices configured to perform specific functions.

Referring to FIG. 1B, routing optimization platform 102 may include one or more processors 111, memory 112, and communication interface 113. A data bus may interconnect processor 111, memory 112, and communication interface 113. Communication interface 113 may be a network interface configured to support communication between routing optimization platform 102 and one or more networks (e.g., network 101, or the like). Memory 112 may include one or more program modules having instructions that when executed by processor 111 cause routing optimization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of routing optimization platform 102 and/or by different computing devices that may form and/or otherwise make up routing optimization platform 102. For example, memory 112 may have, store, and/or include a routing optimization module 112a, a routing optimization database 112b, and a machine learning engine 112c. Routing optimization module 112a may have instructions that direct and/or cause routing optimization platform 102 to route requests for voice call sessions in an optimized manner, as discussed in greater detail herein. Routing optimization database 112b may store information (e.g., demographics information, representative performance data, or the like) used by routing optimization module 112a and/or routing optimization platform 102 in routing requests for voice call sessions and/or in performing other functions. Machine learning engine 112c may have instructions that direct and/or cause the routing optimization platform 102 to route requests for voice call sessions and to set, define, and/or iteratively refine optimization rules, techniques and/or other parameters used by the routing optimization platform 102 and/or other systems in computing environment 100.

Figure 2A:
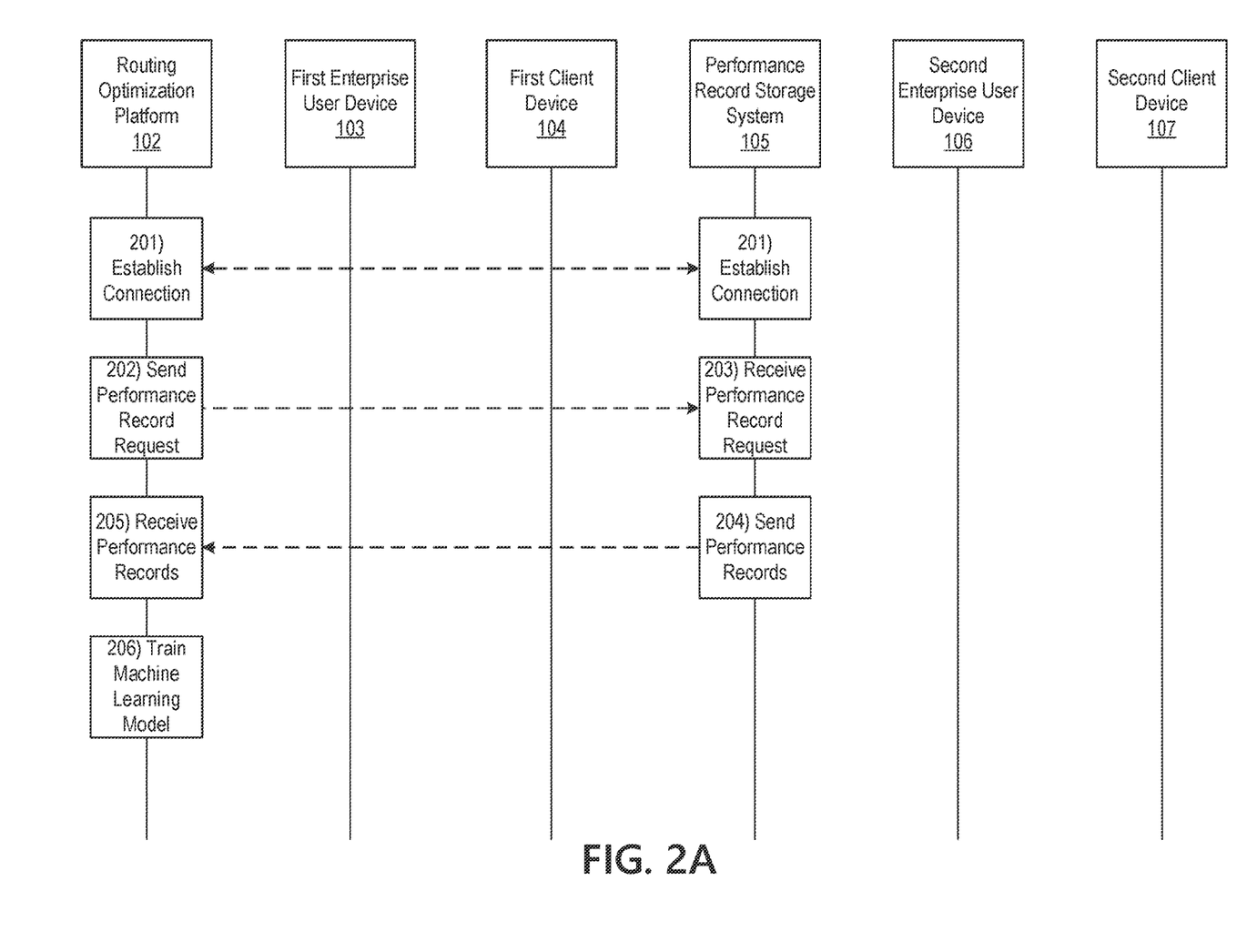
FIGS. 2A-2D depict an illustrative event sequence for applying machine learning for optimized communication routing in accordance with one or more example embodiments.

FIGS. 2A-2D depict an illustrative event sequence for applying machine learning to optimize communication routing in accordance with one or more example embodiments. Referring to FIG. 2A, at step 201, the routing optimization platform 102 may establish a connection with the performance record storage system 105. For example, the routing optimization platform 102 may establish a first wireless data connection with the performance record storage system 105 to link the routing optimization platform 102 to the performance record storage system 105 (e.g., in preparation for requesting performance records). In some instances, the routing optimization platform 102 may identify whether or not a connection is already established with the performance record storage system 105. If a connection is already established with the performance record storage system 105, the routing optimization platform 102 might not re-establish the connection. If a connection is not yet established with the performance record storage system 105, the routing optimization platform 102 may establish the first wireless data connection as described herein.

At step 202, the routing optimization platform 102 may send a request for performance records to the performance record storage system 105. For example, the routing optimization platform 102 may send a request for records indicating each representative's success with clients corresponding to a plurality of demographics information. In this example, the routing optimization platform 102 may request records indicating whether a sale was made, a policy was converted, a policy was bundled, and/or other information indicating that communications between each client-representative pair was or was not successful (e.g., were items sold, policies converted, rates bundled, and/or provide other services rendered by the representative to the client that may financially benefit the enterprise organization?), along with demographics information for each corresponding client (e.g., gender, previous accidents, previous contact with the enterprise organization, age, family composition, marital status, education level, income level, geographic information, automobile information (e.g., year, make, model), traffic violations, or other demographics information). For example, the other demographic information may also include, among other things, the vehicle ownership status (e.g., whether the automobile is owned or rented) as determined by client input, record database, public property tax records, or other data source. In some instances, the routing optimization platform 102 may send the performance record request via the communication interface 113 and while the first wireless data connection is established.

At step 203, the performance record storage system 105 may receive the request for performance records sent at step 202. For example, the performance record storage system 105 may receive the request for performance records while the first wireless data connection is established.

At step 204, the performance record storage system 105 may identify and send performance records and corresponding client demographics data to the routing optimization platform 102. For example, the performance record storage system 105 may identify records indicating each representative's success with clients corresponding to a plurality of demographics information (e.g., gender, previous accidents, previous contact with the enterprise organization, age, family composition, marital status, education level, income level, geographic information, or other demographics information), and may send these records to the routing optimization platform 102. In some instances, the performance record storage system 105 may send the performance records to the routing optimization platform 102 while the first wireless data connection is established.

At step 205, the routing optimization platform 102 may receive the performance records sent at step 204. For example, the routing optimization platform 102 may receive the performance records via the communication interface 113 and while the first wireless data connection is established.

At step 206, the routing optimization platform 102 may train a machine learning model using the performance records received at step 205. For example, the routing optimization platform 102 may train the machine learning model to output a performance score indicating a likelihood of success for each of a plurality of representatives in communicating with each of a plurality of clients corresponding to different demographics information. For example, the routing optimization platform 102 may train the machine learning model to identify that, based on the performance records, a first representative is historically more successful than a second representative in communicating with clients in a first geographic region (e.g., more likely to make a sale in the first geographic region), and the second representative is historically more successful than the first representative in communication with clients in a second geographic region (e.g., more likely to make a sale in the second geographic region). In this example, the routing optimization platform 102 may train the machine learning model based on performance records indicating more success by the first representative with clients in the first geographic region and more success by the second representative with clients in the second geographic region.

In some instances, in training the machine learning model, the routing optimization platform 102 may train the machine learning model in a supervised manner using labelled data (e.g., historical client demographics data labelled with whether or not a sale was made and an identifier of the corresponding representative, and/or other correlations between demographics data, representative identification information, and communication success information). For example, the routing optimization platform 102 may train the machine learning model using one or more of analytical learning, artificial neural networks, backpropagation, boosting, decision tree learning, support vector machines, random forests, and/or other supervised learning methods.

Figure 2B:
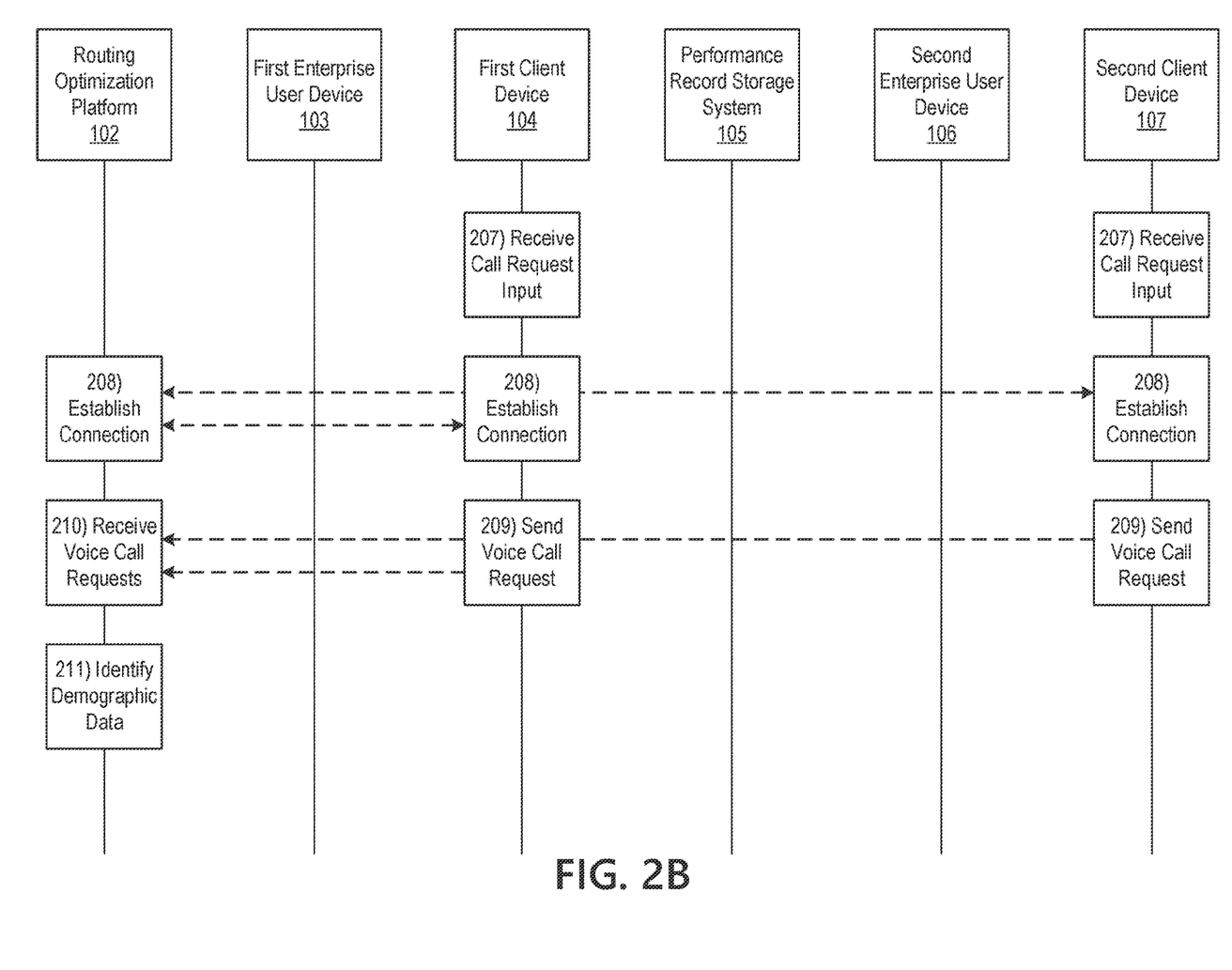

Referring to FIG. 2B, at step 207, the first client device 104 and/or the second client device 107 may receive a call request input. For example, the first client device 104 and/or the second client device 107 may receive a user input requesting to establish a voice call session with an enterprise organization (e.g., an agent, customer service representative, and/or other employee at an insurance institution). Additionally or alternatively, the first client device 104 and/or the second client device 107 may receive a request to establish a different type of communication with the enterprise organization (e.g., text, instant messaging, and/or other communication session with a customer service representative).

Additionally or alternatively, the first client device 104 and/or the second client device 107 may receive user input through a web based interface (e.g., a web text to chat, web voice interface, and/or other communication interface), and may proceed to step 208 accordingly. Although the following steps are primarily described with regard to a voice call session, other web based interface communications may be used throughout without departing from the scope of the disclosure. In some instances, the user input received at step 207 may be used in the selection process described below to match clients and representatives.

At step 208, the first client device 104 and/or the second client device 107 may establish connections with the routing optimization platform 102. For example, the first client device 104 and/or the second client device 107 may establish second and/or third wireless data connections respectively to link the first client device 104 and/or the second client device 107 to the routing optimization platform 102 (e.g., for the purpose of sending the requests to establish a voice call session). In some instances, the first client device 104 and/or the second client device 107 may identify whether a connection is already established with the routing optimization platform 102. If a connection is already established with the routing optimization platform 102, the first client device 104 and/or the second client device 107 might not re-establish the connection. If a connection is not yet established with the routing optimization platform 102, the first client device 104 and/or the second client device 107 may establish the second and/or third wireless data connections as described herein.

At step 209, the first client device 104 and/or the second client device 107 may send the requests to establish a voice call session (and/or other communication session), based on the user input received at step 207, to the routing optimization platform 102. For example, the first client device 104 and/or the second client device 107 may send the requests to establish a voice call session while the second and/or third wireless data connections are established.

At step 210, the routing optimization platform 102 may receive the requests to establish a voice call session (and/or other communication session) from the first client device 104 and/or the second client device 107. For example, the routing optimization platform 102 may receive the requests to establish a voice call session via the communication interface 113 and while the second and/or third wireless data connections are established. In some instances, in receiving the requests to establish a voice call session, the routing optimization platform 102 may receive or otherwise identify a phone number and/or caller identifier corresponding to the first client device 104 and/or the second client device 107. Additionally or alternatively, the routing optimization platform 102 may receive information provided as part of interactive voice response (IVR) prompts (e.g., responses to open ended questions such as "how may I help you?" and/or specific questions such as "what is your name," "what is your policy number," "what product are you interested in" or "where do you live?"). In these instances, the routing optimization platform 102 may use one or more voice to text techniques to parse responses to these questions.

At step 211, the routing optimization platform 102 may identify demographic data corresponding to users of the first client device 104 (e.g., a first client) and/or the second client device 107 (e.g., a second client). For example, the routing optimization platform 102 may query, using the phone numbers corresponding to the first client device 104 and/or the second client device 107, an internal and/or external data storage system storing client demographics data (e.g., gender, previous accidents, previous contact with the enterprise organization, age, family composition, marital status, education level, income level, geographic information, and/or other demographics information). In some instances, the routing optimization platform 102 may query the internal and/or external storage system for the client demographics data after receiving permission and/or consent from individuals corresponding to the client demographics data. In some instances, the internal and/or external data storage system may include publicly and/or commercially available demographics data. In response to the query from the routing optimization platform 102, the routing optimization platform 102 may receive or otherwise identify the demographics data corresponding to the first client and/or the second client. Additionally or alternatively, the routing optimization platform 102 may identify the demographic data based on responses to the IVR prompts.

Figure 2C:
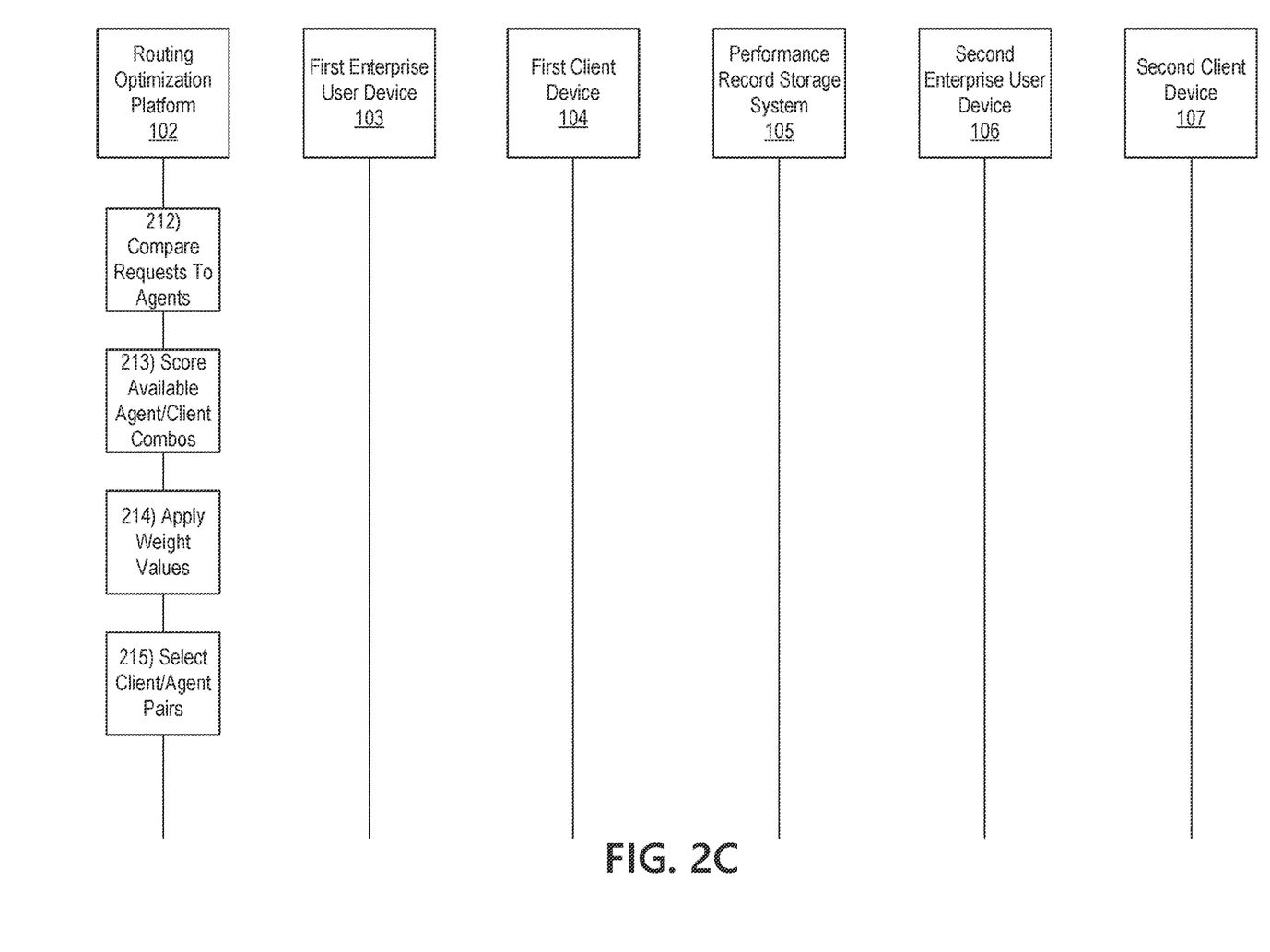

Referring to FIG. 2C, at step 212, the routing optimization platform 102 may compare a number of requests to establish a voice call session (e.g., from various clients) to a number of available representatives (e.g., representatives who are not currently engaged in another voice call session). For example, in some instances, the routing optimization platform 102 may receive more requests to establish a voice call session than available representatives. In other instances, the routing optimization platform 102 may have more available representatives than requests to establish a voice call session.

At step 213, the routing optimization platform 102 may score available client-representative combinations. For example, using the machine learning model, the routing optimization platform 102 may identify client-representative combinations most likely to result in a successful outcome (e.g., increase sales, sell items, convert a policy, bundle rates, and/or provide other advantages). In instances where the routing optimization platform 102 identifies more available representatives than voice call session requests received, the routing optimization platform 102 may score, using the machine learning model, each available representative with each client to identify an optimal representative to serve each client (and thus may leave some representatives available while serving every client). In instances where the routing optimization platform 102 identifies fewer available representatives than voice call session requests, the routing optimization platform 102 may identify an optimal client to be served by each available representative (e.g., all representatives will be directed to serve a client, but not all clients will be immediately served).

In some instances, the routing optimization platform 102 may identify available representatives as representatives that are not currently engaged in a voice call session with another client. In some instances, however, the routing optimization platform 102 may identify representatives that are currently engaged in a voice call session, but may predict, using one or more machine learning algorithms, language understanding algorithms, and/or other techniques, that the voice call session is expected to end within a predetermined period of time (e.g., less than one minute, less than two minutes, less than five minutes, or the like). In these instances, the routing optimization platform 102 may identify these representatives as available for purposes of computing client-representative combination scores, and may effectively pre-compute client-representative combination scores for these representatives regardless of the fact that they are currently engaged in another voice call session. In doing so, the routing optimization platform 102 may optimize or otherwise prescribe assignment of these representatives to clients based on an expected remaining duration of these other voice call sessions.

In some instances, in addition to scoring client-representative combinations for a current time (e.g., to assign a representative to a client in substantially real time), the routing optimization platform 102 may score client-representative combinations for future times corresponding to predetermined time intervals after a current time (e.g., a wait time of five minutes, ten minutes, thirty minutes, and/or another wait time). For example, the routing optimization platform 102 may identify different fall rates for different clients indicating a reduction in representative effectiveness with a particular client as wait/hold time increases (e.g., clients may have different tolerances for being on hold). For example, in applying the machine learning model, the routing optimization platform 102 may score each client-representative combination as described below.

The routing optimization platform 102 may identify demographic ranges for each representative (e.g., a top three set of demographic ranges for which each representative is most successful (e.g., most likely to make a sale, convert a policy, bundle rates, and/or provide other services to the client that may financially benefit the enterprise organization) for a plurality of information types such as age, family composition, marital status, education level, income level, geographic information, and/or other demographics information). For example, for each representative, the routing optimization platform 102 may analyze the historical communications of that representative to identify target demographics for which the representative has historically been most successful (e.g., most sales made, policies converted, rates bundled, and/or other services provided to clients that may financially benefit the enterprise organization). The routing optimization platform 102 may identify client demographics corresponding to successful client-representative communications for each representative, and may identify, based on an aggregation of the client demographics, which demographics are most frequently correlated with the representative's success. For client-representative combinations with a number of matching demographic ranges (e.g., ranges for gender, previous accidents, previous contact with the enterprise organization, age, family composition, marital status, education level, income level, geographic information, and/or other demographics information) that exceeds a predetermined threshold percentage (e.g., 90% match), the routing optimization platform 102 may apply various algorithm/models as described below.

For example, the routing optimization platform 102 may apply these algorithms to compute optimal (e.g., most like to result in sales, policy conversions, bundling, and/or provide other advantages) client-representative combinations. For instances, such algorithms may take into account numerical representations of historical performance data for representatives (e.g., with higher numbers indicating a more successful communication session), elapsed time since each of the historical communications, and/or other information. In further instances, additional or alternative factors/inputs may be implemented. In some instances, the routing optimization platform 102 may weight or otherwise adjust one or more of the numerical representations of historical communications based on factors such as elapsed time, success rates, and/or other factors.

As a specific example, the routing optimization platform 102 may apply the following algorithm: client-representative score=$\alpha(1-t1)+\beta(1-t2)+ \ldots +n(1-tn)$, where: a corresponds to a first historical communication for the representative and $\beta$ corresponds to a second historical communication for the representative, where $\alpha$ and $\beta$ equal 0 for an unsuccessful communication or 1 for a successful communication (e.g., increase sales, sell items, convert a policy, bundle rates, and/or provide other advantages). In these instances, t1 and t2 may indicate an amount of time since the first historical communication and second historical communication respectively. By applying these time weight values, the routing optimization platform 102 may weight more recent interactions higher than older interactions. The routing optimization platform 102 may continue the above described calculation for a total number of communications (n) participated in by the representative. Although this specific algorithm is described herein, other algorithms/models/examples may be implemented without departing from the scope of the disclosure. In some instances, this algorithm/model may be refit or retrained on a periodic (e.g., monthly) basis to take into account updates in representative performance.

In some instances, the routing optimization platform 102 may compute (e.g., using one or more variables for optimization) client-representative scores for a current time, and one or more future times (e.g., if the client is put on hold for a particular period of time). For example, the routing optimization platform 102 may use the machine learning model to ascertain that a wait time (e.g., in seconds, minutes, or another time measurement unit) may decrease likelihood of a client receiving optimal service. For example, waiting for the representative may cause the client to experience an increased level of frustration. Accordingly, rather than assigning a client to a representative for which he or she has the highest client-representative score regardless of wait times, the routing optimization platform 102 may calculate the likely duration to the next representative becoming available (e.g., the anticipated hold time) and the marginal decline in the scoring of each client (e.g., the fall off rate).

To do so, the routing optimization platform 102 may identify, based on historical performance data, historical fall rates corresponding to clients with corresponding demographics information (e.g., employment status, age, education level, household composition, number of vehicles owned, time of day, and/or other demographics information). For example, the routing optimization platform 102 may identify that clients in a first age range are less likely to be affected by being on hold than clients in a second age range. In this example, the routing optimization platform 102 may identify that, based on historical data, clients in the first age range are 5% less likely to purchase a product after a five minute hold time, whereas clients in the second age range are 30% less likely. After computing the fall rate, the routing optimization platform 102 may multiply the client-representative score by the fall rate to extrapolate for each of the one or more future times. For example, if the client-representative score is 15 and the fall rate is 0.05% per 5 minutes of delay, the routing optimization platform 102 may compute a client-representative score of 15*0.95=14.25, which may correspond to the client-representative combination if a 5 minute delay is experienced. In some instances, the routing optimization platform 102 may compute overall client-representative combination scores by adding the scores for the current time and the one or more future times. In these instances, the selection of client-representative combinations (described below at step 215) may be based, at least in part, on the overall combination scores.

At step 214, the routing optimization platform 102 may weight the client-representative scores further. For example, the routing optimization platform 102 may adjust the client-representative scores computed at step 213 based on a frequency of interaction between the given representatives and clients. For example, the routing optimization platform 102 may apply a higher weight value to the scores where the corresponding representatives frequently interacts with clients in the corresponding demographic (e.g., more than a threshold amount of times), whereas the routing optimization platform 102 may apply a lower weight value to the scores where the corresponding representatives do not frequently interact (e.g., less than the threshold amount of times) with clients in the corresponding demographics.

At step 215, the routing optimization platform 102 may select client-representative combinations by selecting client-representative combinations with the highest weighted scores. For example, if the first client has a higher score when paired with the first representative than when paired with the second representative, the routing optimization platform 102 may select the first representative for routing of the request to establish a voice call session for the first client.

Figure 4:
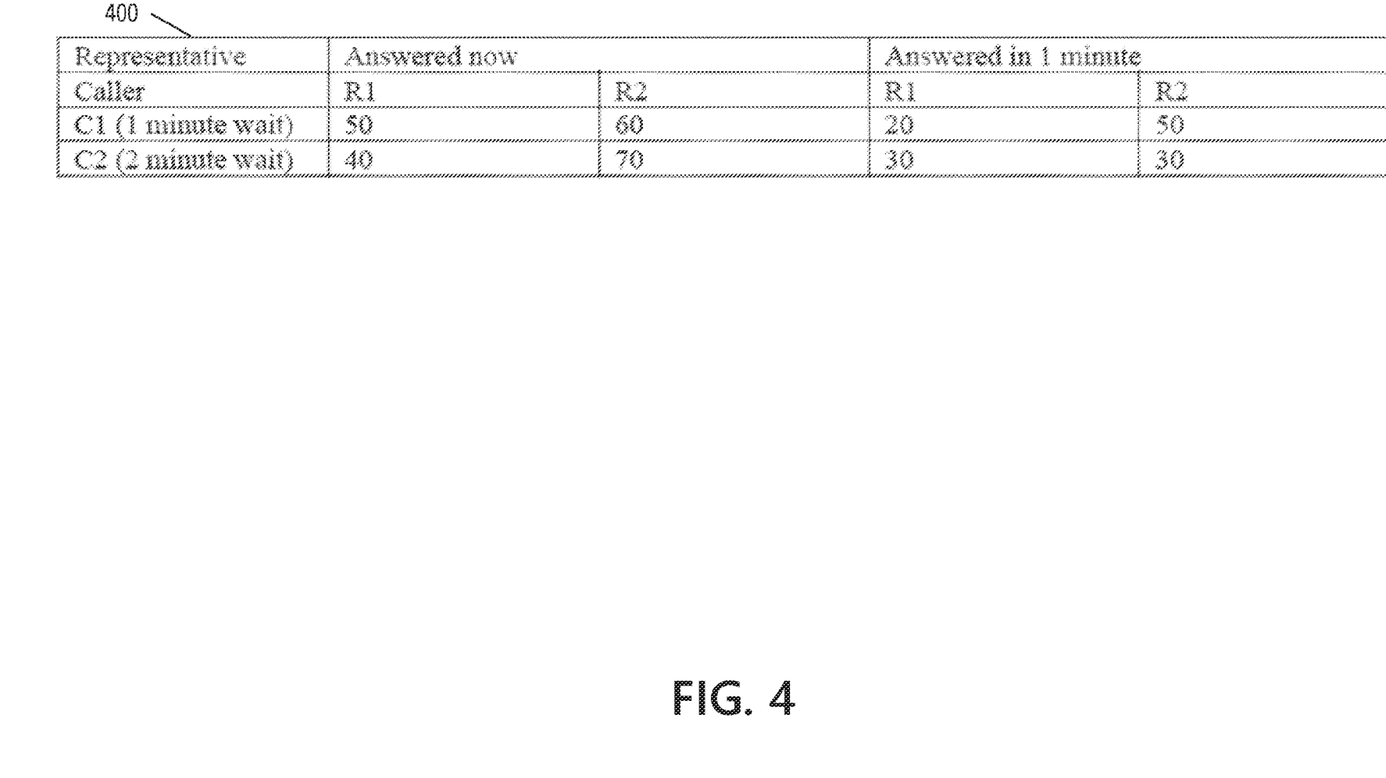
FIG. 4 depicts an illustrative table showing an application of machine learning for optimized communication routing in accordance with one or more example embodiments.

In some instances, the routing optimization platform 102 may identify that a first client-representative combination has a higher score than a second client-representative combination at a current time, but that the second client-representative combination has a higher score than the first client-representative combination at a later time (e.g., one minute later). To further illustrate this concept, possible client-representative scores are shown in table 400, which is illustrated in FIG. 4.

For example, if two clients (e.g., the first client and the second client) have been waiting for one minute and two minutes respectively, the routing optimization platform 102 may compute client-representative scores for available combinations at both a current time and a future time (e.g., after a one minute hold period). If a first representative (e.g., R1) becomes available, but the routing optimization platform 102 identifies that a second representative (e.g., R2) will be available in one minute, then the routing optimization platform 102 may compute scores for both clients. Accordingly, if a representative becomes available, but the routing optimization platform 102 predicts that a second representative will be available in a minute, the routing optimization platform 102 may be compare the various client-representative scores as described below.

For example, as shown in table 400, the combination of the first client and first representative may have a current score of 50, and the first client and the second representative may have a future score of 50. Accordingly, the routing optimization platform 102 may identify that there is no marginal decline if the first client is placed on hold to wait for the second representative. In contrast, the second client and the first representative may have a current score of 40, and the second client and the second representative may have a future score of 30. Accordingly, the routing optimization platform 102 may identify that there is a marginal decline of 10 if the second client is placed on hold to wait for the second representative. In this case, the routing optimization platform 102 may select the first representative to be paired with the second client, even though the first representative and first client combined for a better initial score (e.g., to avoid the marginal decline described above).

As another example, referring to table 400, if the routing optimization platform 102 identifies that the second representative has become available, but that the first representative may be available in one minute, the routing optimization platform 102 may compare current and future scores for both representatives accordingly. For example, the routing optimization platform 102 may identify the first client and second representative have a current score of 60 and the first client/first representative combination has a future score of 20, and thus may identify a marginal decline of 40 if the first client is placed on hold to wait for the second representative. In addition, the routing optimization platform 102 may identify the second client and the second representative have a current score of 70, and the second client/first representative have a score of 30, and thus may identify a marginal decline of 40 if the second client is placed on hold to wait for the second representative, accordingly, the routing optimization platform 102 may identify that both queued clients likelihood of success decline equally. In these instances, the routing optimization platform 102 may apply a "coin flip" and/or other random method for assigning client-representative pairs.

By operating in this manner, the routing optimization platform 102 not only ensures that calls do not keep getting pushed back in time (e.g., by placing a maximum wait time before a client is moved to the head of the queue), but also implements intelligent decisions about disparate effects of wait times on different callers through a model that includes wait time as a feature.

In some instances, if a client and representative are badly matched, it may be advantageous to have the client wait until another representative who is a better match for the client becomes available, and it may be advantageous to have the representative wait until a better matched client calls.

By weighting these scores, the routing optimization platform 102 may generate measures indicating how likely a particular client-representative combination is to result in a successful outcome (e.g., executed sale, policy conversion, policy bundling, and/or other sales advantages).

For illustrative purposes, at step 215, the routing optimization platform 102 may select the first representative for the first client and the second representative for the second client.

Figure 2D:
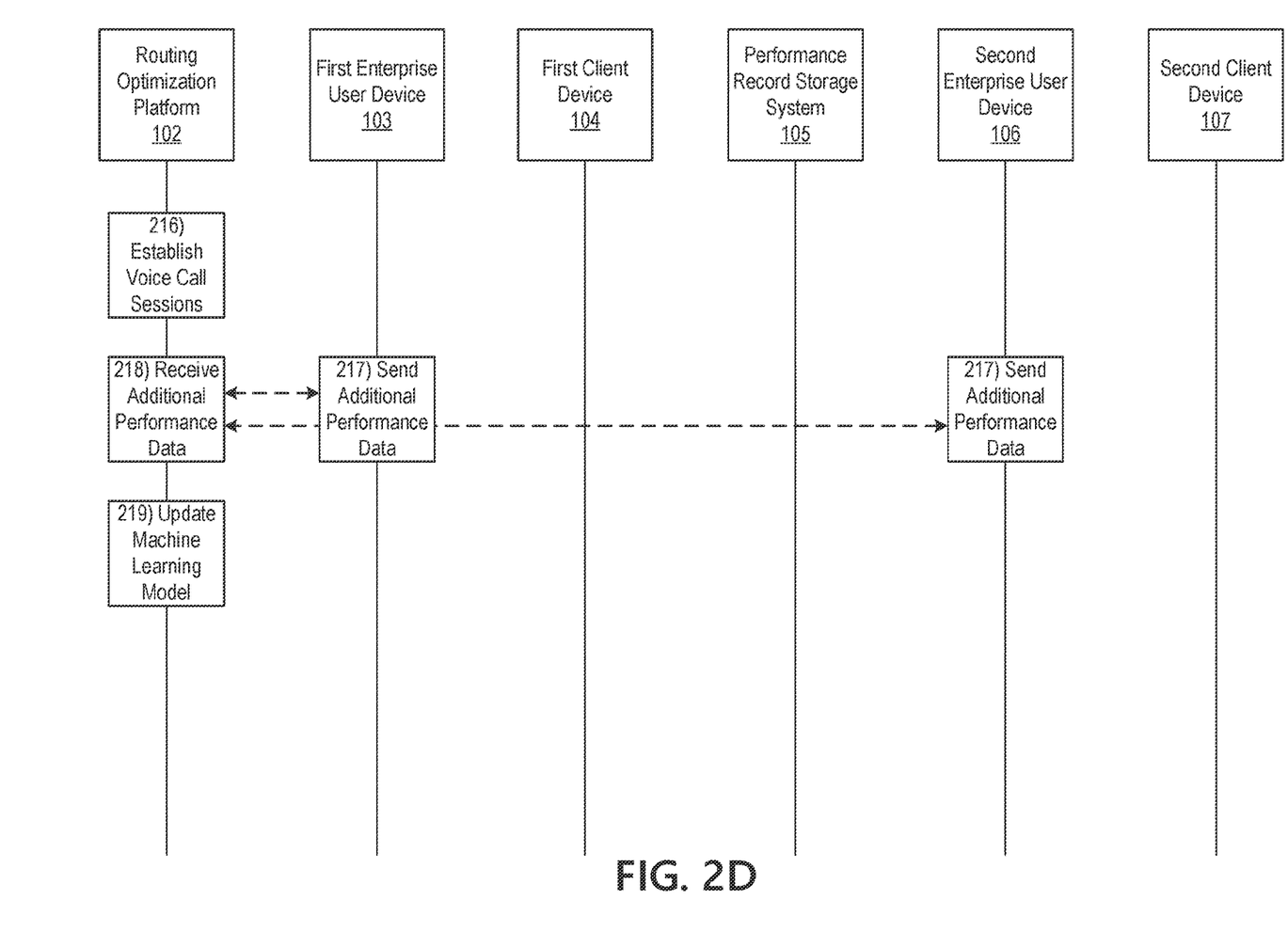

Referring to FIG. 2D, at step 216, based on the selections made at step 215, the routing optimization platform 102 may establish voice call sessions between the first client device 104 and the first enterprise user device 103, and between the second client device 107 and the second enterprise user device 106.

At step 217, the first enterprise user device 103 and the second enterprise user device 106 may send updated performance data to the routing optimization platform 102. For example, the first enterprise user device 103 and the second enterprise user device 106 may send information indicating whether or not the corresponding representatives were successful in interacting with the corresponding clients (e.g., increase sales, sell items, convert a policy, bundle rates, and/or provide other advantages).

At step 218, the routing optimization platform 102 may receive the updated performance data sent at step 217. For example, the routing optimization platform 102 may receive the updated performance data via the communication interface 113.

At step 219, the routing optimization platform 102 may update the machine learning model using the updated performance data received at step 218. In doing so, the routing optimization platform 102 may dynamically adjust the machine learning model to continually output optimal representative/client combinations based on updated and/or changing representative performance.

For example, in some instances, the routing optimization platform 102 may retrain the machine learning model to account for organic shifts in data (e.g., over time an agent may improve at handling clients corresponding to particular demographics data). In some instances, this shift in data may occur due to inherent randomness in inputs for the machine learning model (e.g., an agent may occasionally be assigned a client corresponding to different demographic data, such as individuals of a different age range, which may allow the machine learning model to organically grow and refit to the agent). When enough data is received, the routing optimization platform 102 may detect and incorporate these changes to an agent's skill set within a predetermined time period so as to retrain/refit the machine learning model to account for these changing/evolving abilities.

In addition or as an alternative to the organic methods of retraining described above, in some instances, the routing optimization platform 102 may purposefully introduce different demographics or test instances with an expectation/result mismatch. In doing so, the routing optimization platform 102 may allow agents to be introduced to clients corresponding to different demographics with a frequency that might not occur in an organic evolution. For example, an agent may have a positive history (e.g., a 90% sale rate, or other measure of success) with 50 year old clients, and thus may be purposefully introduced to 20 year old clients so as to develop his or her skillsets in interacting with clients of this demographic. Initially, the agent might not match with the 20 year olds (e.g., may have only a 10% sale rate, or other measure of ineffective communication). However, over time, the agent may improve his or her ability to interact with 20 year old clients, and thus the routing optimization platform 102 may start routing more 20 year old clients to the agent than 50 year old clients (even though the routing optimization platform 102 previously identified that the agent's optimal demographic age was 50 year old individuals). In doing so, the routing optimization platform 102 may cause agents to be optimized with individuals corresponding to different demographic groups and to perform organic retraining within these demographic groups, while still maintaining previously identified optimizations (e.g., such as the agent and the 50 year olds described above). For example, an agent may become optimized for communicating with 20 year olds, while still maintaining his or her skills at communicating with 50 year olds.

Although two client devices and enterprise user devices are described through the event sequence, this is for illustrative purposes only, and any number of client devices and enterprise user devices may perform the methods described herein without departing from the scope of the disclosure. In addition, although a specific machine learning model/algorithm is described (e.g., the algorithm described at step 213), this is merely an example, and a variety of models/processes may be used without departing from the scope of the disclosure. Furthermore, although optimal routing is described, in some instances, the routing optimization platform 102 may route requests to establish a voice call session to representatives using random call assignment to ensure that each representative receives a range of callers with various values of each feature. For example, even as the routing optimization platform 102 trains and updates that machine learning model, it may be important for the routing optimization platform 102 to receive performance data that is not correlated with clients corresponding to each representative's optimal characteristics (e.g., based on the demographics data). If performance between the representative and the client is consistent with the machine learning model in these instances, the routing optimization platform 102 may determine that the model is robust and may be trusted, whereas if performance between the representative and the client is inconsistent with the machine learning model in these instances, the routing optimization platform 102 may determine that additional performance data should be gathered for the particular representative and the machine learning model should be updated accordingly.

Figure 3:
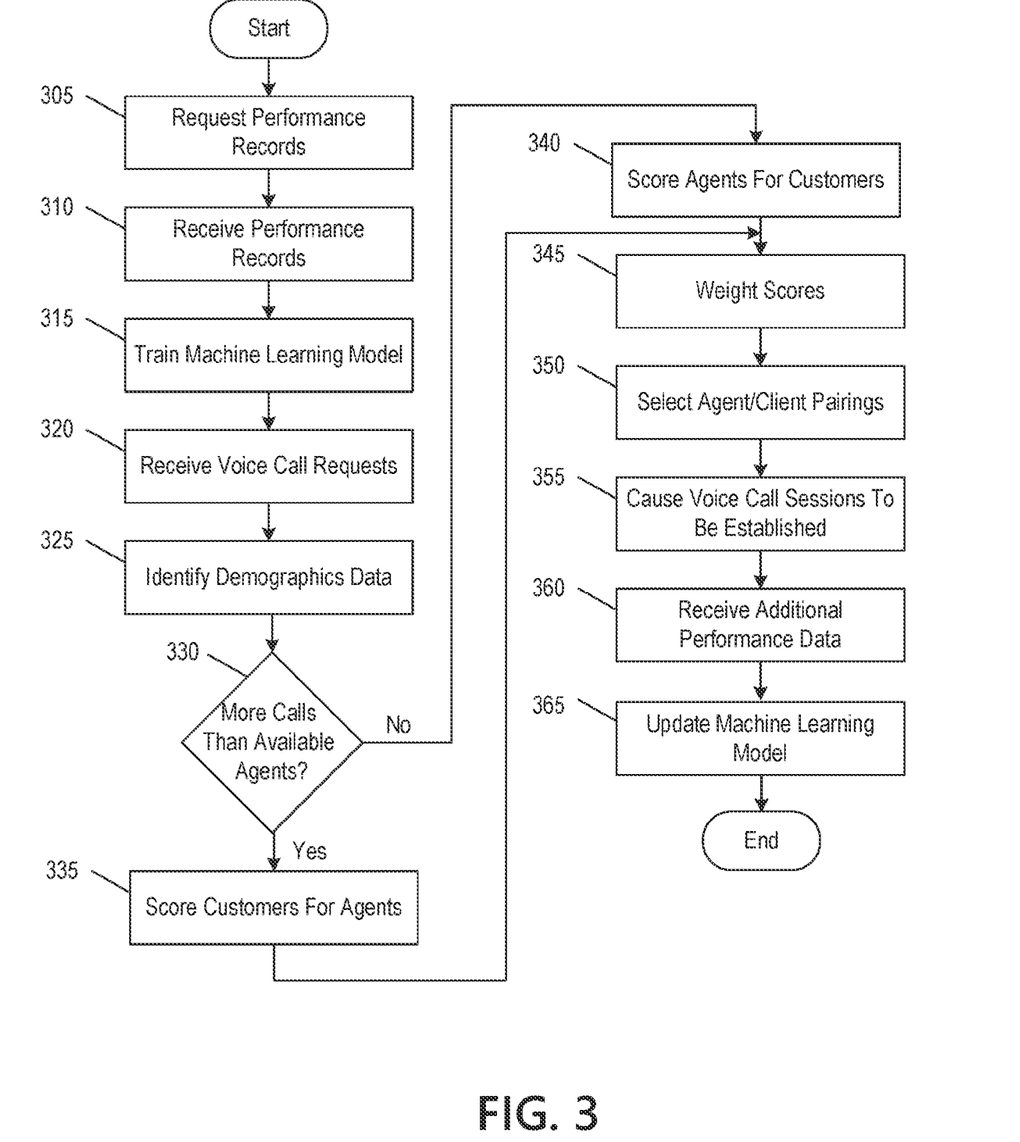
FIG. 3 depicts an illustrative method for applying machine learning for optimized communication routing in accordance with one or more example embodiments.

FIG. 3 depicts an illustrative method for applying machine learning for optimized communication routing in accordance with one or more example embodiments. Referring to FIG. 3, at step 305, a computing platform having at least one processor, a communication interface, and a memory may request performance records indicating representative performance with a plurality of clients. At step 310, the computing platform may receive the performance records requested at step 305. At step 315, the computing platform may train a machine learning model using the performance records. At step 320, the computing platform may receive requests to establish voice call sessions. At step 325, the computing platform may identify demographics data based on phone numbers corresponding to the voice call session requests. At step 330, the computing platform may identify whether the number of requests for voice call sessions exceeds a number of available representatives. If the number of requests does exceed the number of available representatives, the computing platform may proceed to step 335. If the number of requests does not exceed the number of available representatives, the computing platform may proceed to step 340.

At step 335, the computing platform may score the clients corresponding to the requests for each representative. At step 340, the computing platform may score each available representative for the clients corresponding to the requests. At step 345, the computing platform may weight the scores based on time and/or frequency of interaction information. At step 350, the computing platform may select one or more representative/client pairings based on the weighted scores. At step 355, the computing platform may cause the requested voice call sessions to be established based on the selected representative/client pairings. At step 360, the computing platform may receive additional performance data collected during the voice call sessions. At step 365, the computing platform may update the machine learning model based on the additional performance data.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, from one or more client devices, a number of requests to establish a voice call session;
   identify, based on phone numbers corresponding to the one or more client devices, demographic information corresponding to users of the one or more client devices;

score, using a machine learning model and based on the demographic information and performance data for each of a plurality of representatives, potential client-representative combinations;

adjust the scores, generated by the machine learning model, by applying a weight value to the scores, wherein the weight value is based on a historical frequency of interaction between each representative and clients corresponding to the identified demographic information;

select, based on the adjusted scores, at least one of the potential client-representative combinations; and establish the voice call session for the at least one of the potential client-representative combinations.

2. The computing platform of claim 1, wherein the memory stores additional computer-readable instructions that, when executed by the at least one processor, further cause the computing platform to:

collect representative performance data indicating sales performance of each of the plurality of representatives during their communication with clients corresponding to different demographics data; and train, using the representative performance data, the machine learning model, wherein training the machine learning model configures the machine learning model to output the scores.

3. The computing platform of claim 1, wherein adjust the scores, generated by the machine learning model, further includes applying an adjustment to the scores that indicates how likely a representative of a particular potential client-representative pair is to make a sale to the corresponding client of the particular potential client-representative pair.

4. The computing platform of claim 1, wherein the demographics information indicates one or more of: age, family composition, marital status, education information, income information, or geographic information corresponding to the users of the one or more client devices.

5. The computing platform of claim 1, wherein scoring the potential client-representative combinations further comprises:

comparing the number of requests to establish the voice call session to a number of available representatives;

based on identifying that the number of requests to establish the voice call session exceeds the number of available representatives, scoring, using the machine learning model, combinations of each available representative with each user corresponding to the requests to establish the voice call session to identify an optimal user for each representative to serve; and based on identifying that the number of available representatives exceeds the number of requests to establish the voice call session, scoring, using the machine learning model, combinations of each available representative with each user corresponding to the requests to establish the voice call session to identify an optimal representative to serve each user.

6. The computing platform of claim 1, wherein the score for each potential client-representative combination indicates a likelihood of a successful outcome resulting from establishing the voice call session between the respective client and representative, the score for each of the potential client-representative combinations is based on fall off rates for each of the users of the one or more client devices, wherein the fall off rates indicate changes in the likelihood of a successful outcome of a representative with each of the users of the one or more client devices as a time during which the client is put on hold increases, and the fall off rates indicate a tolerance for being on hold for the users of the one or more client devices.

7. The computing platform of claim 1, wherein the memory stores additional computer-readable instructions that, when executed by the at least one processor, further cause the computing platform to:

identify the plurality of representatives, wherein identifying the plurality of representatives comprises:

identifying representatives that are currently available to engage in the voice call session, and identifying representatives that are not currently available, but that will likely be available within a predetermined amount of time.

8. The computing platform of claim 1, wherein adjusting the scores further comprises adjusting, based on time information corresponding to the performance data.

9. The computing platform of claim 1, wherein scoring the potential client-representative combinations comprising:

scoring the potential client-representative combinations at a first time and one or more second times, wherein the one or more second times are later than the first time; and computing an overall score for each client-representative combination by adding the scores for the first time and the one or more second times.

10. The computing platform of claim 9, wherein selecting the at least one of the potential client-representative combinations comprises selecting the at least one of the potential client-representative combinations based on the overall scores.

11. The computing platform of claim 1, wherein the memory stores additional computer-readable instructions that, when executed by the at least one processor, further cause the computing platform to:

receive additional performance data from the selected at least one of the potential client-representative combinations; and update, based on the additional performance data, the machine learning model.

12. A method comprising:

at a computing platform comprising at least one processor, a communication interface, and memory:

receiving, from one or more client devices, a number of requests to establish a voice call session;

identifying, based on phone numbers corresponding to the one or more client devices, demographic information corresponding to users of the one or more client devices;

scoring, using a machine learning model and based on the demographic information and performance data for each of a plurality of representatives, potential client-representative combinations;

computing an overall score for each client-representative combination by adding the scores for a first time and one or more second times;

adjusting the overall scores, generated by the machine learning model, by applying a weight value to the overall scores, wherein the weight value is based on a historical frequency of interaction between each representative and clients corresponding to the identified demographic information;

selecting, based on the adjusted scores, at least one of the potential client-representative combinations; and establishing the voice call session for the at least one of the potential client-representative combinations.

13. The method of claim 12, further comprising:
collecting representative performance data indicating sales performance of each of the plurality of representatives during their communication with clients corresponding to different demographics data; and
training, using the representative performance data, the machine learning model, wherein training the machine learning model configures the machine learning model to output the scores.

14. The method of claim 12, wherein adjusting the overall scores, generated by the machine learning model, further includes applying an adjustment to the overall scores that indicates how likely a representative of a particular potential client-representative pair is to make a sale to the corresponding client of the particular potential client-representative pair.

15. The method of claim 12, wherein the demographics information indicates one or more of: age, family composition, marital status, education information, income information, or geographic information corresponding to the users of the one or more client devices.

16. The method of claim 12, wherein scoring the potential client-representative combinations further comprises:
comparing the number of requests to establish the voice call session to a number of available representatives;
based on identifying that the number of requests to establish the voice call session exceeds the number of available representatives, scoring, using the machine learning model, combinations of each available representative with each user corresponding to the requests to establish the voice call session to identify an optimal user for each representative to serve; and
based on identifying that the number of available representatives exceeds the number of requests to establish the voice call session, scoring, using the machine learning model, combinations of each available representative with each user corresponding to the requests to establish the voice call session to identify an optimal representative to serve each user.

17. The method of claim 12, wherein the score for each potential client-representative combination indicates a likelihood of a successful outcome resulting from establishing the voice call session between the respective client and representative, the score for each of the potential client-representative combinations is based on fall off rates for each of the users of the one or more client devices, wherein the fall off rates indicate changes in the likelihood of a successful outcome of a representative with each of the users of the one or more client devices as a time during which the client is put on hold increases, the score for each of the potential client-representative combinations is generating by scoring the potential client-representative combinations at the first time and the one or more second times, wherein the one or more second times are later than the first time, and the fall off rates indicate a tolerance for being on hold for the users of the one or more client devices.

18. The method of claim 12, further comprising:
identifying the plurality of representatives, wherein identifying the plurality of representatives comprises:
identifying representatives that are currently available to engage in the voice call session, and
identifying representatives that are not currently available, but that will likely be available within a predetermined amount of time.

19. The method of claim 12, wherein adjusting the scores further comprises adjusting, based on time information corresponding to the performance data.

20. One or more non-transitory computer-readable media storing instructions that, when executed by a computing platform comprising at least one processor, a communication interface, and memory, cause the computing platform to:
collect representative performance data indicating sales performance for each of a plurality of representatives with clients corresponding to different demographics data;
train, using the representative performance data, a machine learning model, which configures the machine learning model to output scores for each potential client-representative combination indicating a likelihood of a successful outcome resulting from establishing a voice call session between the respective client and representative;
receive, from one or more client devices, a number of requests to establish the voice call session;
identify, based on phone numbers corresponding to the one or more client devices, demographic information corresponding to users of the one or more client devices;
score, using the machine learning model and based on the demographic information and performance data for each of the plurality of representatives, potential client-representative combinations;
adjust the scores, generated by the machine learning model, by applying a weight value to the scores, wherein the weight value is based on a historical frequency of interaction between each representative and clients corresponding to the identified demographic information; and
select, based on the adjusted scores, at least one of the potential client-representative combinations, wherein selecting the at least one of the potential client-representative combinations comprises selecting a first client-representative combination and a second client representative-combination; and establish the voice call session for the at least one of the potential client-representative combinations.

* * * * *